D. LANE.
Saw Mill.
No. 2,186. Reissued March 6, 1866.
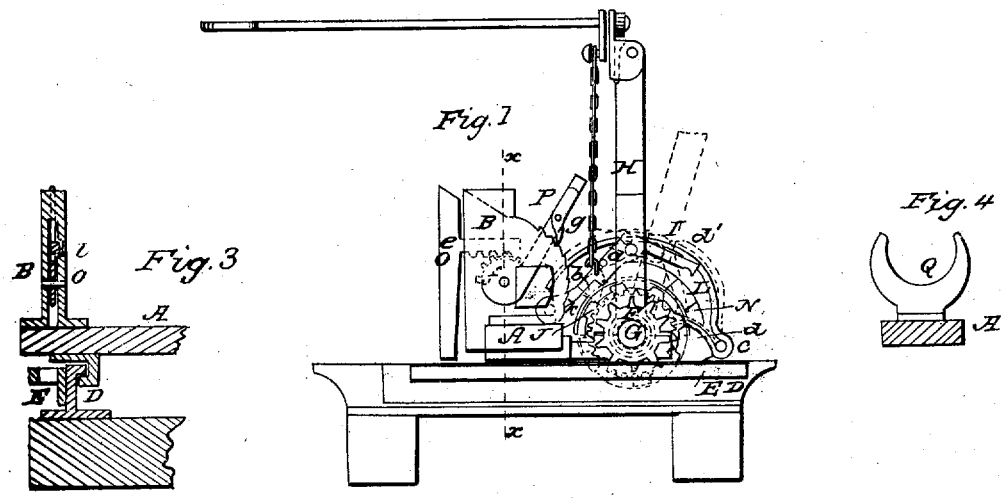
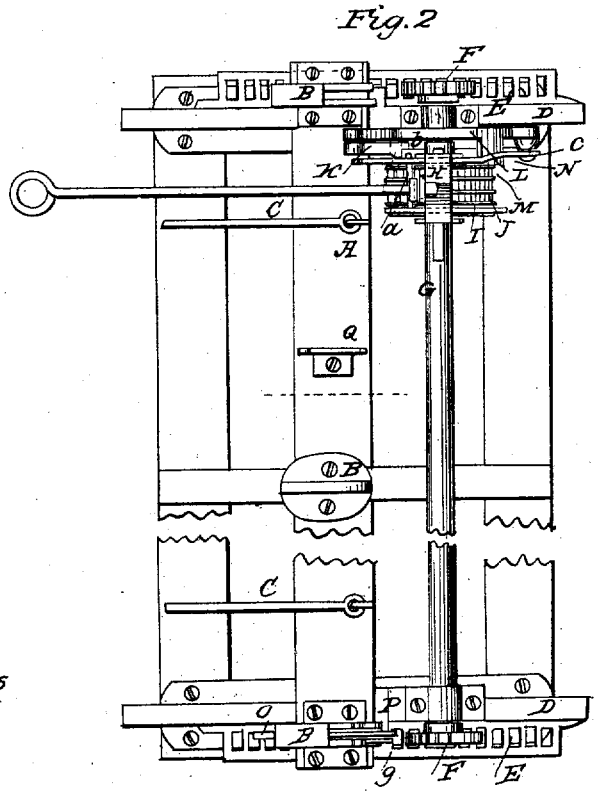
Witnesses
C L Topliff
Henry Morris
Inventor
Dennis Lane
per Munn & Co
attorneys
N. PETERS, Photo-Lithographer, Washington, D. C.

UNITED STATES PATENT OFFICE.

DENNIS LANE, OF MONTPELIER, VERMONT.

IMPROVEMENT IN HEAD-BLOCKS FOR SAW-MILLS.

Specification forming part of Letters Patent No. 44,100, dated September 6, 1864; Reissue No. 2,186, dated March 6, 1866.

*To all whom it may concern:*

Be it known that I, DENNIS LANE, of Montpelier, in the county of Washington and State of Vermont, have invented a new and useful Improvement in Saw-Mill Carriages; and I do hereby declare that the following is a full, clear, and exact description thereof, which will enable others skilled in the art to make and use the same, reference being had to the accompanying drawings, forming a part of this specification, in which—

Figure 1 is an end view of my invention; Fig. 2, a plan or top view of the same; Fig. 3, a section of a portion of the same, taken in the line *x x*, Fig. 1; Fig. 4, a detached view of a fork pertaining to the same.

Similar letters of reference indicate like parts.

This invention relates to certain improvements in a saw-mill carriage for which Letters Patent were granted to me, bearing date July 9, 1861, and January 12, 1864.

A represents the carriage, having uprights B attached to it, to which the log is secured by dogs C. This carriage is fitted and works on two parallel ways, D D, each of which has a rack, F, secured permanently to it at the outer side. Into these racks E E pinions F F gear, said pinions F being on the ends of a shaft, G, the bearings of which are attached to the carriage A; hence it will be seen that by turning the shaft G the carriage, with the log attached, may be moved back and forth and the log adjusted to the saw as required.

The shaft G is turned by means of a lever, H, having a pawl, I, fitted in it, which engages with any one of a series of ratchets, J, on the shaft. This arrangement, being precisely like that formerly patented by me, does not require any particular description.

By this arrangement it will be seen that the carriage may be operated or adjusted in any place which will receive the racks E E, whereas if the racks were attached to the carriage and moved with it, as heretofore, considerable more space would be required to admit of the movement of the racks; hence by this improvement I can apply the carriage in cases where a limited space would not admit of the previous invention being used.

The ratchets J are all connected together on the shaft G, and the former are provided with teeth of different sizes, in order to vary the setting movement of the carriage according to the thickness it is desired to cut the stuff from the log, and the pawl I, which may be adjusted so as to gear into any one of these ratchets J, has a pin, *a*, passing transversely through it, which, when the lever is drawn forward, comes in contact with a latch, K, when the latter is dropped forward on a bearing, *b*, which projects from a segment, L, on the carriage. This latch K, when thus adjusted, shortens the sweep of the lever H, and when it is thrown back a full sweep is allowed said lever.

M is a ratchet, which is attached to one side of the ratchets J, and has a dog, N, engaging with it. This dog is of curved form, as shown in Fig. 1, and it is pivoted to the segment L, as shown at *c*, the short part *d* being the dog proper and the long part *d'* a lever which projects over in front of the ratchets J. This dog may thus be conveniently thrown out from the ratchet N by the pin *a* when the pawl I is adjusted to move back the carriage.

The upright B, at the end of the carriage opposite to that where the ratchets J work, has a vertical slide, O, fitted in it, said slide having a rack-bar, *e*, projecting from its rear side at right angles, into which a pinion or toothed segment, *f*, at the end of a lever, P, gears. This lever P is provided with a pawl, *g*, which catches into rack-teeth on the rear of the upright. By this means I employ but a single rack and pinion or toothed segment for adjusting the slide O to give a taper position to the log, whereas in my former invention a double rack and two pinions were employed.

Q is a fork, which is attached vertically to the carriage at such a point that it may receive and hold the dog C. One or more of these forks may be used, according to the number of dogs employed. They admit of the dogs being readily grabbed by the operator in adjusting a log to the carriage.

Having thus described my invention, I claim as new and desire to secure by Letters Patent—

1. The arrangement of the stationary open racks E, wheels F, and shaft G, constructed and operating in the manner and for the purpose herein specified.

2. The dog N, applied to the segment L and bent or curved as shown, to operate in connection with the ratchet M and pin *a* of pawl I, substantially as described.

3. The latch K, applied to the segment L, in connection with the pin *a* of the pawl I, arranged substantially as shown, to regulate the sweep of lever H.

DENNIS LANE.

Witnesses:
JONA. PERKINS, 2d,
M. C. HOOKER.